US007871479B2

(12) United States Patent
Garland

(10) Patent No.: US 7,871,479 B2
(45) Date of Patent: Jan. 18, 2011

(54) METHOD AND SYSTEM FOR MANUFACTURING LABEL KITS COMPRISED OF CARRIER SHEETS HAVING LABELS OF SPECIFIC SHAPE REMOVABLY RETAINED THEREON

(75) Inventor: William Garland, Mississauga (CA)

(73) Assignee: Duramark Technologies, Inc., Westfield, IN (US)

( * ) Notice: Subject to any disclaimer, the term of this patent is extended or adjusted under 35 U.S.C. 154(b) by 1226 days.

(21) Appl. No.: 11/403,936

(22) Filed: Apr. 14, 2006

(65) Prior Publication Data

US 2006/0233995 A1 Oct. 19, 2006

(30) Foreign Application Priority Data

Apr. 14, 2005 (CA) .................................... 2504266

(51) Int. Cl.
*B32B 37/00* (2006.01)

(52) U.S. Cl. ......................... 156/64; 156/252; 156/253; 156/277

(58) Field of Classification Search ................... 156/64, 156/247, 248, 250, 252, 253, 267, 268, 269, 156/270, 277, 387, 510
See application file for complete search history.

(56) References Cited

U.S. PATENT DOCUMENTS 5,865,918 A * 2/1999 Franklin et al. ............... 156/64
6,358,342 B1 * 3/2002 Instance ...................... 156/64

* cited by examiner

*Primary Examiner*—James Sells
(74) *Attorney, Agent, or Firm*—Jacobson Holman PLLC

(57) ABSTRACT

A method for the manufacture of label kits is described. Each kit comprises one or more of carrier sheets having one or more labels of specific shape and containing specific information associated with a specific product or parts thereof on which they are to be affixed. The labels have an adhesive backing removably retained on a surface of the carrier sheet. The method uses a digital printer and a laminator die-cutting machine which is computer controlled with the data being automatically printed and labels automatically cut into a web whereby to form detachable labels, some having a UV protected clear or opaque synthetic or paper surface material face sheet. The carrier sheets are cut from the web and individually placed or stacked into kits or piles to form label kits containing a predetermined number of such labels associated with a specific product or part with the carrier sheets potentially containing a tracking code identifying the specific kit to the product.

8 Claims, 2 Drawing Sheets

METHOD AND SYSTEM FOR MANUFACTURING LABEL KITS COMPRISED OF CARRIER SHEETS HAVING LABELS OF SPECIFIC SHAPE REMOVABLY RETAINED THEREON

TECHNICAL FIELD

The present invention relates to a method and system for manufacturing label kits comprised of carrier sheet(s) having labels of specific or variable shape and content removably retained thereon.

BACKGROUND ART

For labeling manufactured parts or products during the manufacturing process, it is the current practice for label converters to produce pre-printed labels, typically in roll form (but also in sheets or packs), and to ship these to assembly plants on a regular basis to keep up with usage while providing continuing modifications to these labels to meet changing requirements. Many of the labels are option specific with two or more designs specific to the product, component or part and its optional features. Examples of these are in the assembly of automobiles, manufacturing equipment, large household appliances, etc. where many models are fabricated and several labels need to be placed on components or parts. The assembly worker must therefore recognize the type of model and the options that are associated therewith and to which parts specific labels have to be applied. He must also be aware of changes in labels due to regional or national legislation or language requirements. Some components or parts have one label regardless of options, while others have 2, 3 or more designs depending on product model or optional equipment. One can imagine that with automobile manufacturing where there are several vehicle options that excessive care must be used in applying the proper labels. For example, at a Chrysler Assembly Plant, twenty-three (23) different labels need to be applied to certain vehicles and which labels are subject to some Government legislation. The correct label for each of these legislated labels must be on each car, component or part and all other labels must be present and accurate before delivery to a consumer. Each of these labels may have multiple formats based on the vehicles' options—6 cylinder engine or 4 cylinder, air conditioning or no air conditioning. Legislation in Canada, California or Germany where the car is to be delivered also requires specific information content. The language of the country of delivery must be used. The current label application process is subject to errors and consequently vehicle recalls.

Because the labeling of parts of a vehicle or other products such as washing and drying machines, dishwashers, stoves, etc., is at the mercy of choice by hourly paid assembly workers, decision making is vested in them. Failure to comply with proper labeling can result in fines, recalls of products, bodily injury, and can lead to litigation and civil court awards. With certain car manufacturing, improper labeling is a repetitive cause for recalls, i.e., if a label is missing or a wrong label is applied. There is therefore a need to overcome this problem and to facilitate the application of proper labels to component parts of various types of products which are assembled by people.

At DaimlerChrysler's Windsor Assembly Plant, it was recognized by Enio Parete, Aldo Pallisco and Jim Lazzarin that there was a need to remedy this problem directly at the plant and therefore a system needed to be developed to prevent or substantially eliminate these errors caused by assembly personnel.

There is therefore a need to eliminate procurement complexity for ordering labels customized to specific product variation, a need for production stoppage or delay due to label stock outages to be eliminated, a need to eliminate sequencing complexity, line ordering, inventory hold of products that are mislabeled, a need to eliminate or substantially reduce liability exposure, a need to hold of products that are mislabeled, a need to eliminate or substantially reduce liability exposure, a need to facilitate label validation, a need to improve cost, quality, substantially reduce or eliminate downtime and re-labeling and confusion with labels that are printed in multi-language, a need to provide labels in kit form which correctly provides all labels for part of or all of a manufactured assembly, and a need to provide labels in kits which can be applied correctly at the time of manufacture or shipped with the product and applied in a foreign country to meet language, legislation, product or consumer requirements in that country.

Accordingly, Applicants introduced the present invention which is a kitting system to improve the error-proofing of the labeling process, and which eliminates errors requiring the company to re-label or recall vehicles. The kitting system of the present invention satisfies the above-mentioned needs and resolves the problems by providing the correct labels for each vehicle in a kit format whereby the incidence of errors in labeling can be resolved.

SUMMARY OF INVENTION

It is therefore a feature of the present invention to provide a method of manufacturing label kits with each kit comprising one or more carrier sheets having one or more labels associated with a specific product, component or part thereof and which provides the needs that are above-identified.

According to a further broad aspect of the present invention there is provided a system for manufacturing label kits associated with specific products and which overcome the above-mentioned disadvantages of the prior art.

According to a still further broad aspect of the present invention there is provided a label kit for labeling distinct component parts of a specific product and which substantially overcome the above-mentioned disadvantages of the prior art.

Another feature of the present invention is that the user person that applies the labels to the specific product, or parts thereof, does not have to go through a selection process in determining which label should be applied to a predetermined part of the specific product. This kit overcomes this selection process and provides error-proofing and improvements in the efficiency of current assembly processes where specific products vary along an assembly line or process, such as in the assembly of automotive vehicles or other durable products.

According to the above features, from a broad aspect, the present invention provides a method of manufacturing label kits with each kit comprising one or more carrier sheets having one or more labels of specific or variable shape or content and comprising specific information associated with a specific product or a part thereof. The labels have an adhesive backing removably retained on a surface of the carrier sheet(s). The method comprises inputting into a computer controlled digital (thermal, laser, ink jet etc.) printer, data relating to the specific information and specific shape of the labels in association with one of the products, components or parts and its specific carrier sheet(s). The method often comprises inputting a tracking code (bar code, number, R.F. chip) linking the label kit to the specific product, component or part.

The data or content relating to the specific information and tracking code is printed on the under surface of a continuous or sheeted clear synthetic material (polyester, vinyl, polypropylene, polyethylene, lexan etc.) as it is moving through the printer. The printing could also be on the surface of a clear or coloured synthetic face stock, to be herefor called the face sheet, depending on application requirements. The data is printed at specific locations associated with the label requirements for the production process. The printing step is repeated in continuity depending on input data relating to the number of label images to be printed along the face sheet and contained in the kit. A continuous or sheet liner having an adhesive layer on an adhesive release top face thereof is applied against the printed data on the rear surface of the face sheet. The labels are die-cut according to the data relating to the specific shape of the labels through the face sheet material to the release liner. The continuous release liner sheets with the die-cut labels are then sheeted into individual kits.

The method also comprises the potential of removing a cut-out matrix (waste face material around and between label cavities) of the clear face sheet from the adhesive backer carrying the labels. Whereby the individual carrier sheet (kit) is comprised of the release liner sheet with one or multiple labels adhesively removable from the top surface of the release liner sheet.

According to a further broad aspect of the present invention there is provided a label kit for labeling distinct component parts of a specific product, component or part. The label kit comprises one or more label carrier sheets (kits) carrying specific adhesive backed labels positioned on release coated carrier sheets whereby the labels can be permanently adhered to specific component parts. Each label kit may contain a tracking code identifying the specific product it is to be applied to.

According to a still further broad aspect of the present invention there is provided a system for manufacturing label kits of the type as above-mentioned. The system comprises a computer controlled digital (thermal, laser, ink jet etc.) printer. The printer then feeds a roll of a clear or coloured synthetic (polyester, vinyl, polypropylene, polyethylene, lexan etc.) film or paper material(refered to as the face sheet). This face sheet material is digitally printed (in one or multiple colours) on the top surface or bottom (under) surface, providing static or variable label designs. A laminator/die cutting/matrix stripping device is provided to secure a liner sheet with an adhesive layer on a release surface (silicone or other) to the face sheet with printed matter (label content) visible on or through the surface of the face sheets. Computer controlled die-cutting is provided for cutting static or variable label shapes through the face sheet and adhesive on the liner sheet. Sheeting, perforating, die cutting or print highlighting is provided for cutting or defining the beginning and end of the liner sheet containing associated die-cut labels thereon into individual label carrier sheets (kits). However, label kits could be provided in rolls or fan fold packs in addition to cut sheets.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
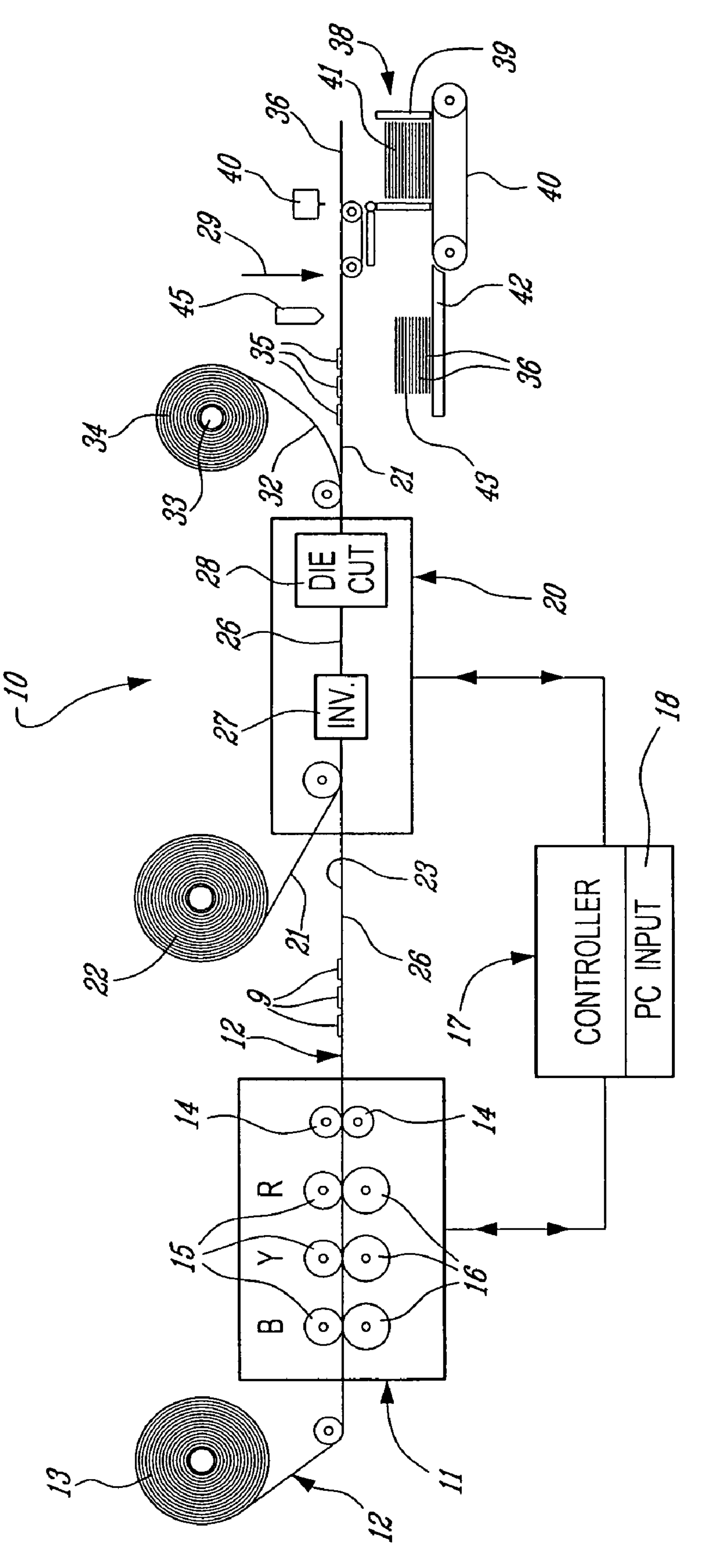
FIG. 1 is a block diagram illustrating an example of a system for the manufacturing of label kits in accordance with the present invention.

Referring now to FIG. 1, there is shown generally at 10 the system and method for the manufacture of label kits in accordance with the present invention. The system comprises a computer controlled digital printer 11 (monochrome or colour) such as a laser, ink jet, wax thermal or any other digital printer to which is fed a clear or coloured face sheet 12 from a feed roll 13. The face sheet 12 is drawn through the printer 11 by draw rolls 14 which may be associated with the printer or could be located downstream of the system. The printer is provided with—thermal ribbons, ink, toner each of which may be associated with a different colour. Each print station 15 may be associated with a base or pressure backing roller 16.

Figure 2:
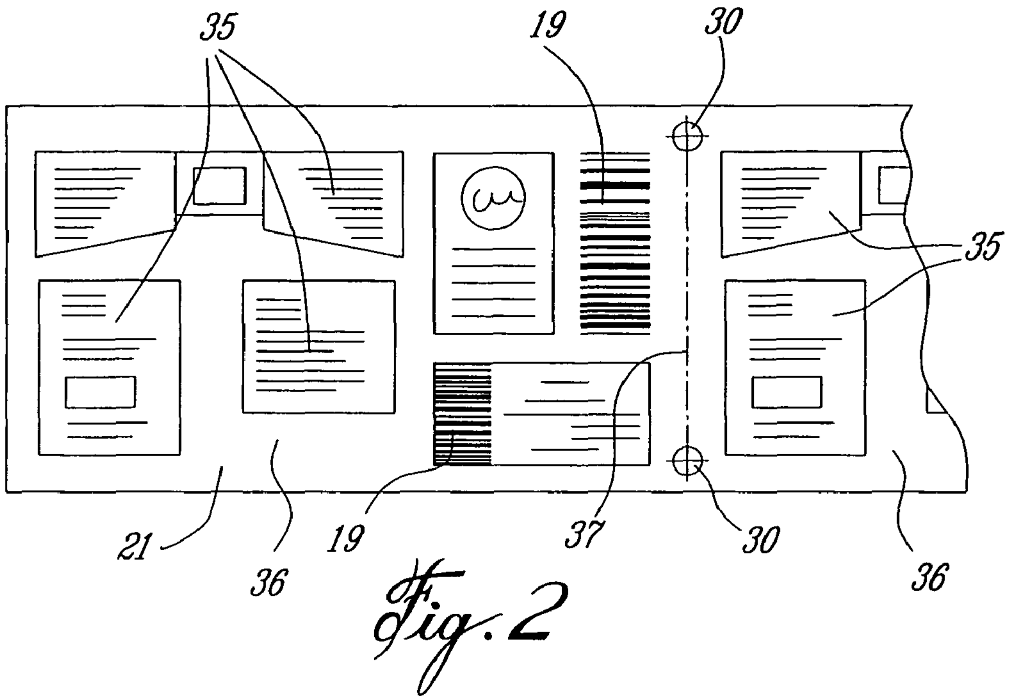
FIG. 2 is a plan view of the composite laminated printed clear synthetic sheet secured to the adhesive surface of a liner sheet and illustrating various labels printed in a carrier sheet section thereof.

A computer controller device 17 is inputted, through a PC 18, data associated with a tracking code or specific product identifier such as the bar code 19, as illustrated in FIG. 2, to identify a specific manufacturing assembly for example an automobile, appliance, turbine having specific options associated therewith. The controller 17 is further inputted data relating to the specific labels associated with or required for that specific product or tracking code. The data also comprises data relating to matter, information and graphics to be printed on each of the labels, the number of labels to be produced as well as the shape of the labels. The computer controller transmits the printing data to the computer controlled digital printer 11. It also feeds the label shape (cut files) data to a laminator and die-cutting device 20. The die cutter is a digital device using laser light or digital blade die cutting technologies. The laminator 20 is a digital finishing laminator and it applies a continuous liner sheet 21 from a supply roll 22 against the face sheet with the printed data 9 on the rear or top face sheet surface 23, herein the top surface 23, of the face sheet 12.

Figure 4:
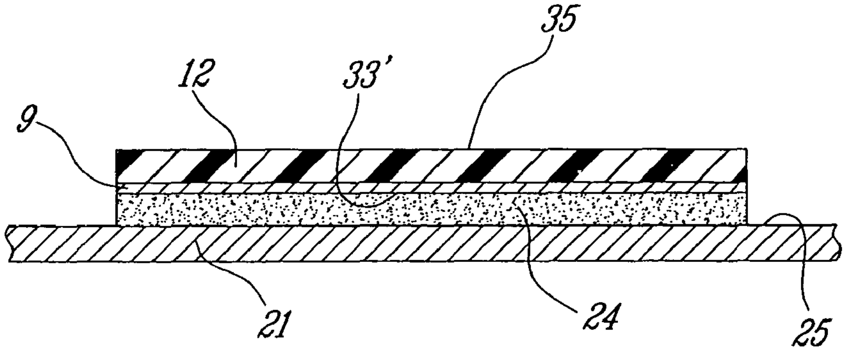
FIG. 4 is a section view showing the composition of a label releasably attached to a release surface of a liner sheet.

As shown in FIG. 4, the liner 21 is carrying an adhesive layer 24 which releases from the surface 25 of the liner, which is usually a silicon (release) treated liner when the adhesive is secured to the back or surface of another sheet or material (fce sheet) to which it has a stronger retention force, herein the rear surface 23' of the face sheet 12. Such release liners are well known in the art. Accordingly, the laminator secures a liner over the printed data on the rear or front surface of the face sheet with the digitally printed data showing through the top surface 26 of the face sheet or on the top surface of the face sheet.

Such device can take various forms, such as passing the laminated sheets through inverting rolls, etc. With the top surface 26 now being uprighted, the laminated product is fed through a die-cutter device 28 which comprises a pivotally mounted knife or laser light cutting source which functions in accordance with the inputted data relating to variable label shapes. The inputted data also comprises sheet sense mark data to print these marks on the synthetic sheet whereby to activate the die cutting light or knife 29, as will be described later. Such sheet marks are illustrated by reference numeral 30 in FIG. 2.

After the labels have been die-cut into the face sheet 12 as well as through the pressure sensitive adhesive 24, the waste face stock 32 (see FIG. 3), may be removed and this is done by winding the waste face stock 32 about a spindle 33 to form a rewind roll 34 of such material. Accordingly, the liner 21 now contains a plurality of labels 35 associated with each carrier sheet 36 to be contained within a kit of a plurality of such labels. These sheets and labels are clearly illustrated in FIG. 2 where it can be seen that the sheets are continuously formed with variably placed and configured labels. The sheet marks 30 delineate a cut-line 37 to separate each of the carrier sheets 36 from the endless (continuous) liner 21. These carrier sheets are cut by a slitting knife/blade mechanism or perforating mechanism, a die, a laser light cutter or may be simply marked for future cutting. The mechanism 29 detects the sheet marks 30 and is activated whereby to separate the carrier sheets from the web or composite liner and labels. This can be done with the carrier liner in movement.

The carrier sheets 36 with labels are then fed into a stacker device 38 which can be of several designs and not limited to the one as illustrated herein. As hereinshown, the stacking device 38 comprises a sheeter, conveyor, stacker (receiver housing) 39 secured over a discharge platform 40, herein a discharge conveyor, whereby to discharge a stack 41 of such carrier sheets onto a stack removal platform 42 where the stack or label kit 43 is removed for application to a manufactured assembly packaging or handling.

The label kit delivery system 43 is comprised of a plurality of label carrier sheets 36 all having specific labels provided with adhesive backing 24 and specific printed matter 19 visible through or on face sheet 12 which may be UV treated. These labels 35 can therefore be removed from the carrier sheet 21 and adhesively secured to associated component parts or to specific product assemblies. Each carrier sheet 36 has a tracking code, herein a bar code, a number, a sense mark or other identifier 19 as shown in FIG. 2, which matches the tracking code or identifier (bar code) on the specific parts or products to which labels need to be applied. Of course, the tracking code 19 can be integrated in any one of the labels 35 and need not be a separate label. Many of the labels can contain the tracking codes.

Summarizing the method of manufacturing of the label kits of the present invention, it includes a computer controller 17 in which is inputted data relating to specific information to be included in a variety of labels and the specific shapes of these labels to be contained preferably, but not exclusively, in a single carrier sheet 36. Tracking code data is also inputted to identify the specific product, the label(s) are to be applied to. Data relating to a specific location for slitting the web to form individual carrier sheets 36 is also inputted by the controller into the digital printer 11 and laminator 20 and also into the die cutting and sheeting device 29. Of course, other control information is fed to all of the devices associated with the system to control all parameters thereof, such as draw speed, tension control and signals from counter 40 which counts the number of carrier sheets fed into the stacker 39 or other detection devices that monitor the amount of film or liner remaining on the feed rolls, etc.

Figure 3:
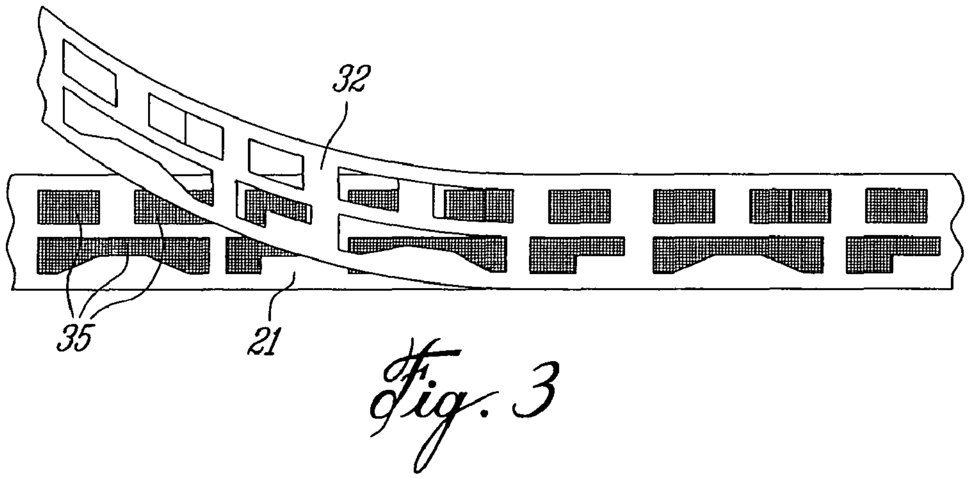
FIG. 3 is a partly fragmented perspective view illustrating the cut-out matrix of the clear polyester sheet and glue backing being removed from the release surface of the liner sheet.

The digital printer 11 prints the data relating to the specific information and tracking code on the rear face surface 23 or front surface of the continuously fed clear or coloured face sheet 12 as it is moving through the printer rolls 15. It also controls the information associated with the color or monochrome digital printer. The printed information is printed at specific locations within the boundaries of labels to be formed as defined by the print software. The printed information is attached to the front or back of the face sheet by ribbons, liquid or dry toner, ink or other digital method associated with the print system 15 and this printed data 9 is only schematically illustrated in FIG. 1, but obvious to a person skilled in the art. The liner is adhesively applied against the rear or top face of the face sheet and the laminated liner and film are then fed through a die-cut device 28 where a knife or laser light is controlled to die-cut the specific shape of the labels about the associated information printed on the rear or surface of the face sheet. The waste face stock matrix material 32 is then removed from the liner 21, as shown in FIG. 3. It is conceivable that this waste face stock matrix material can remain on the carrier sheets and labels detached therefrom simply by bending the sheet at a corner of a label to remove the labels therefrom. It is not an essential feature of the present invention to remove the matrix but by the removal of same it makes it much easier for the user person to detach the labels.

The individual labels on a carrier sheet are positioned in static or variable formats depending on the number of different labels associated with a specific product to form a kit of labels for each product. It is further pointed out that if a very large number of labels are associated with a specific product, then the kit may require more than single carrier sheets to carry labels associated with one specific product. Accordingly, if there is more than one sheet, the sheets can be identified as forming parts of lots, for example sheets 1 2 and 3 associated with a specific product. The sheets of a lot could also be attached together in an accordion fashion by fold lines. In this case, the sheets would have sheet sections attached together by fold line creases or perforations formed in the release liner sheet by a fold line creasing machine 45, as shown in FIG. 1.

It is within the ambit of the present invention to cover any obvious modifications of the preferred embodiment described herein, provided such modifications fall within the scope of the appended claims.

The invention claimed is:

1. A method of manufacturing label kits, each kit comprising a plurality of carrier sheets having one or more labels of specific or different shape and comprising specific information associated with a specific product or a part thereof, said labels having an adhesive backing removably retained on a surface of said carrier sheet, said method comprising the steps of:

i) inputting in a computer controlled digital printer, data relating to said specific or different shape and specific information of said labels in association with one or more of said carrier sheets;

ii) inputting a tracking code data identifying said specific product or part thereof;

iii) printing said data relating to said specific information and tracking code on a rear or top surface of one of a continuous clear or opaque face sheet as it is moving through said printer, said data being printed at specific locations associated with said carrier sheet;

iv) repeating said step (iii) in continuity and depending on input data relating to the number of carrier sheets to be printed along said face sheet and contained in said kit;

v) applying a continuous liner sheet with an adhesive layer on said face containing said printed data to create a laminated label;

vi) die-cutting said labels according to said data relating to said specific shape of said labels above said top surface of said release liner; and vii) delineating or perforating, die cutting or marking for future cutting said continuous release liner sheet with said die-cut labels into individual carrier sheets.

2. A method of manufacturing label kits as claimed in claim 1 wherein said step (vii) of delineating comprises one of slitting, die cutting, perforating or marking for future cutting or perforating.

3. A method of manufacturing label kits as claimed in claim 1 wherein said face sheet is one of a synthetic of paper based or paper face sheet.

4. A method as claimed in claim 2 wherein after said step (vi) there is further provided the step of removing a cut-out matrix of said face sheet and adhesive backing surrounding said labels whereby said individual carrier sheet is comprised of said release liner sheet with said labels adhesively removable from said top surface of said release liner sheet.

5. A method as claimed in claim 4 wherein there is further provided the step of inputting in said computer controlled digital printer data relating to one or more print sense marks to print same on said face sheet to activate said die cutting of said step (vi).

6. A method as claimed in claim 5 wherein there is further provided the step of inputting in said computer controlled digital printer data relating to a sheet mark to print same on said face sheet to activate a digital die cutting device to effect said step (vii).

7. A method as claimed in claim 2 wherein after said step (vii) there is provided the step of (viii) discharging said individual carrier sheets in one of a sheeter, slitting, die cutting, perforating or marking for future cutting device where a batch of a predetermined number of said sheets is formed, and (ix) discharging said batch to form a label kit or a part of a label kit.

8. A method as claimed in claim 2 wherein said computer control digital printer is comprised of one or more color printing heads, and wherein there is further provided the step of inputting color selection data in association with said other data for designation of selected ones of said color printing heads.

* * * * *